United States Patent [19]
Westervelt et al.

[11] 3,743,068
[45] July 3, 1973

[54] DUAL SEAL ARRANGEMENT

[75] Inventors: Ralph Westervelt, Pekin; Lawrence F. Fratzke, East Peoria; Ronald C. Stump, Peoria, all of Ill.

[73] Assignee: Caterpillar Tractor Co., Peoria, Ill.

[22] Filed: Dec. 20, 1971

[21] Appl. No.: 209,561

[52] U.S. Cl. ....... 192/84 C, 192/110 B, 277/DIG. 6, 308/187.1, 417/319
[51] Int. Cl. ...................... F16d 27/06, F16k 41/16
[58] Field of Search................ 277/95, 96 R, 227, 277/229, 233, DIG. 6; 308/36.1, 187.1; 192/84 C; 417/319

[56] References Cited
UNITED STATES PATENTS

| | | | |
|---|---|---|---|
| 2,779,639 | 1/1957 | Bainbridge | 308/187.1 |
| 2,866,670 | 12/1958 | Harris et al. | 308/187.1 |
| 3,231,460 | 1/1966 | Andrews | 277/DIG. 6 |

*Primary Examiner*—Manuel A. Antonakas
*Assistant Examiner*—Allan Russell Burke
*Attorney*—Stephen Westbrook et al.

[57] ABSTRACT

A dual seal arrangement for a drive mechanism of the type having a rotating member and a radially spaced stationary member with a bearing mounting the rotating member on the stationary member, as in a clutch assembly for an air conditioning compressor. The seal arrangement includes a seal support member carried by the rotating member on one side of the bearing, and a rotary fluoroplastic-coated felt seal member secured to the support member for sealing engagement with the stationary member.

A stationary seal member is mounted on the stationary member in spaced relationship to the rotary seal member and on the opposite side of the bearing from the rotary seal member for sealing engagement with the rotating member. The dual seal arrangement thus provides a protective barrier against the entrance of foreign matter into the bearing from either side.

24 Claims, 2 Drawing Figures

INVENTORS
RALPH WESTERVELT
LAWRENCE F. FRATZKE
RONALD C. STUMP

ATTORNEYS 3,743,068

DUAL SEAL ARRANGEMENT

BACKGROUND OF THE INVENTION

Certain mechanisms, such as refrigerant compressors or the like, employ drive units adapted for intermittent activation depending on the requirements of the mechanism. To control activation, these mechanisms usually employ a clutch plate secured to a hub mounted on the mechanism's drive shaft which may be engaged with a continuously driven rotating member by activation of an electro-magnet mounted on the mechanism housing. To permit continuous driving of the rotating member and for compactness, the rotating member is positioned coaxially with the drive shaft on a spindle formed by an extended portion of the mechanism housing. A roller bearing is disposed between the spindle and the rotating member and carries the rotating member on the spindle. The electromagnet, rotating member, and clutch plate are juxtapositioned so that when the electro-magnet is energized, the rotating member is magnetized, attracting the clutch plate which drives the mechanism's drive shaft.

In vehicular installations, these mechanisms are often required to operate in contaminated environments laden with dust, dirt, and moisture and are subjected to high temperatures, all of which are detrimental to bearing and seal life. It is also believed that magnetization of the bearing, when the mechanism is being driven, attracts certain foreign particles. Although the bearings used to mount the rotating member on the spindle are the sealed type, having lip-type seals mounted between the inner and outer races on both sides of the bearing, the bearing faces are exposed to several paths or passages which allow contaminants to pack against the bearing faces and lip-type seals. Over a period of time, the environmental factors and forces within the mechanism cause the contaminants to lift the bearing seals from their seats permitting the entrance of foreign matter into the bearing. This results in failure of the bearing and the need to frequently service the drive unit.

BRIEF SUMMARY OF THE INVENTION

Accordingly, it is an object of this invention to provide a dual seal arrangement to minimize penetration of foreign matter to a normally sealed bearing which enables the bearing seals to retain lubricant within the bearing for longer periods than has otherwise been possible.

Another object of this invention is to provide a dual seal arrangement which imposes only minimal resistance on the rotational components of the mechanism with which the bearing is associated.

In the preferred dual seal arrangement of the present invention, a seal support and bearing retainer cup is carried by the rotating member and has a felt seal bonded thereto and held in sealing relationship to the stationary member of the drive mechanism. A stationary felt seal is disposed on the opposite side of the bearing in sealing engagement with the rotating member.

Other objects and advantages of the present invention will become more readily apparent upon reference to the accompanying drawings and following description.

DESCRIPTION OF THE PREFERRED EMBODIMENTS

Figure 1:
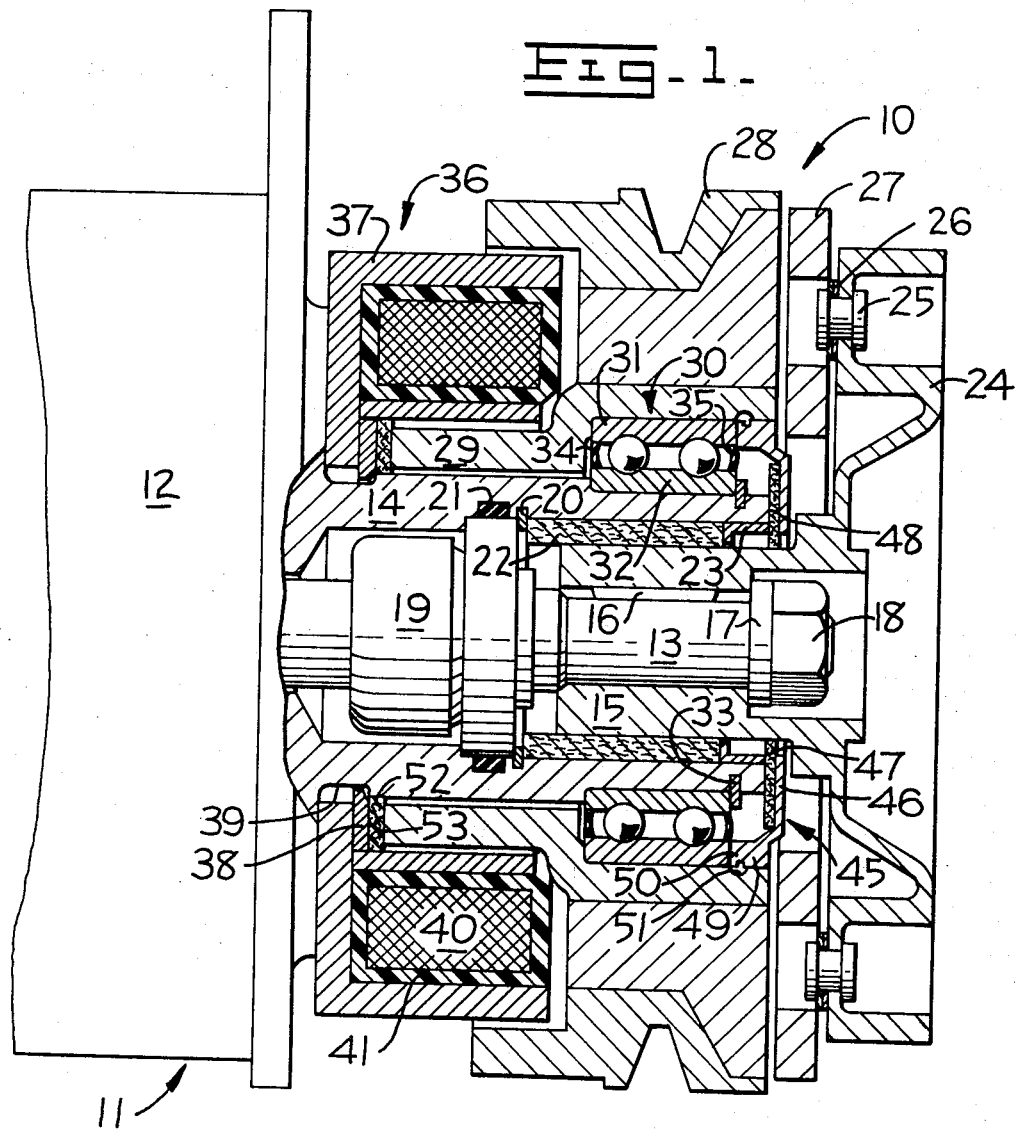
FIG. 1 is a longitudinal vertical section taken centrally through a drive mechanism incorporating the dual seal arrangement of the present invention therein.

Referring to FIG. 1, a drive mechanism embodying the present invention is shown generally at 10 in association with a compressor, a fragment of which is shown generally at 11. The compressor includes a housing 12 and a drive shaft 13. The housing 12 has a cylindrical extension forming a hollow spindle 14 for mounting the drive mechanism 10 thereon.

A shaft assembly comprises shaft 13 extending through the central portion of the spindle and a hub 15 secured thereto in driving relationship by a key 16, a washer 17 and a nut 18. The compressor mechanism is sealed with a conventional face type seal 19 held in place by a ring 20 and sealed on its outer periphery with an o-ring 21. Further sealing between the shaft 13 and the spindle is provided by a felt seal 22 secured within the spindle by a retaining ring 23.

Hub 15 has a radially extending flange 24 mounting a plurality of rivets 25 for securing a pair of lead springs 26 to the flange. The rivets also mount a clutch plate 27 on the flange in facing engagement with the leaf springs. A pulley assembly comprises a pulley 28 adjacent to and in spaced axial relationship with the clutch plate, and a cylindrical member 29 surrounding spindle 14.

A roller bearing assembly 30, rotatably mounting the pulley assembly on spindle 14, has an outer race 31 secured in member 29. An inner race 32 is retained upon the spindle by a retaining ring 33. The bearing has a pair of seals 34 and 35 on opposite sides thereof to retain lubricant within the bearing and to prevent foreign matter from entering therein.

An electro-magnet 36 has a housing 37 secured to compressor housing 12 by a snap ring 38 engaging a groove 39 in the spindle. the electro-magnet includes a coil 40 surrounded by insulation 41.

When the compressor is to be driven, the coil is energized by electrical current from a source, not shown. Magnetic lines of force pass through pulley 14 which attracts clutch plate 27. The clutch plate engages the adjacent face of the pulley, completing the drive connection between the pulley and the hub to drive the shaft and the compressor mechanism connected therewith.

To prevent the ingress of foreign matter into the space between the spindle and the pulley, where it can contact the seals of bearing 30, a dual seal arrangement is provided to seal this space on both sides of the bearing. This arrangement comprises a rotary seal support and bearing retainer cup 45 attached to member 29. The cup includes a radially extending wall 46 which carries a seal 47 bonded thereto. The seal bears against the outer periphery of hub 15 and against an end 48 of spindle 14 in sealing relationship therewith. Seal 47 comprises a felt ring having a face coated with polytetrafluoroethylene to reduce sliding friction between the seal and the end of the spindle.

The cup also has an axially extending annular side wall 49 which acts as a retainer for the outer race of the bearing and terminates in a bead 50 which snaps into a mating groove 51 provided in member 29. A second, stationary seal 52 abuts snap ring 38 and an end face 53 of cylindrical member 29 and is further disposed in sealing relationship with the spindle. Thus, the bearing space between the pulley and the spindle is sealed against entry of foreign matter Pulley 28 is constantly driven in a conventional manner by a V-belt, not shown, causing rotation of the pulley on bearing 30 and spindle 14. This causes cylindrical member 29, cup 45 and seal 47 to rotate about hub 15. When electromagnet 36 is energized to magnetize the pulley, clutch plate 27 is drawn to the pulley which in turn drives flange 24, hub 15 and shaft 13.

Upon driving of the hub, seal 47 remains stationary relative to the outer periphery of the hub, while slidably engaging end 48 of the spindle. Egress of foreign matter towards seal 35 of bearing 30 and towards felt seal 22 and face seal 19 is thus prevented. During such driving, seal 52 is in continuous engagement with end face 53 of cylindrical member 29 to provide a barrier against entrance of foreign matter to seal 34 and bearing 30. The axial spacing of rotating seal member 47 and stationary seal member 52 thus impede the influx of foreign matter toward bearing seals 34 and 35 to prevent destruction of the seals and ultimate failure of bearing 30.

Figure 2:
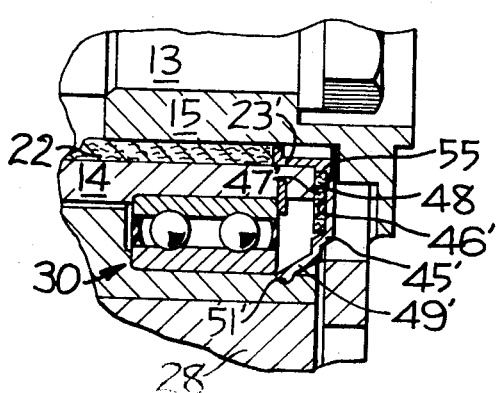
FIG. 2 is a fragmentary sectional view of another drive mechanism showing an alternative embodiment of the present invention.

Referring to FIG. 2 of the drawing, a modified embodiment of the invention is shown wherein a retaining member 23' for a felt seal 22 is extended axially beyond end 48 of spindle 14 to form a shoulder 55 engages a seal 47' in sealing relationship. Seal 47' is secured to radially extending surface 46' of bearing retaining cup 45'. A conical side wall 49' of cup 45' extends outwardly into annular groove 51 of cylindrical extension 29 to act as a retainer for the outer race 31 of bearing 30.

In this embodiment, when pulley 28 revolves about spindle 14, seal 47' rotates about retaining member 23'. Upon activation of the clutch plate and rotation of the hub, the seal still rotates relative to the retainer. This configuration may be utilized where it is desirable to provide seal 47 with the additional support of shoulder 55 of retainer 23'.

In both embodiments, the seal retaining cup also serves as a snap ring to retain the outer race of bearing 30 to limit its axial movement without the use of additional snap rings or the like.

It is thus readily apparent that the present invention provides an improved seal arrangement whereby the ingress of foreign material to the roller bearing is impeded, resulting in a substantial increase in bearing life.

While the invention has been described and shown with particular reference to the preferred embodiments, it will be apparent that variations might be possible that would fall within the scope of the present invention which is not intended to be limited, except as defined in the following claims.

I claim:

1. In a drive mechanism comprising a pulley assembly, disposed for rotation about a longitudinal axis thereof, a spindle and bearing means rotatably mounting said pulley assembly on said spindle, the invention comprising first and second radially disposed sealing means mounted at respective axial sides of said bearing means and positioned in abutting, sealing relationship with end surface portions of said spindle and pulley assemblies.

2. The drive mechanism of claim 1 wherein said first sealing means is further positioned to extend radially inwardly from said pulley assembly past an end surface portion of the spindle assembly in sealing engagement therewith.

3. The drive mechanism of claim 1 wherein said first sealing means includes a cup secured to the pulley assembly to extend radially inwardly toward and past the spindle in closely spaced relationship with an end of the spindle, and a first seal member bonded to said radially extending portion of said cup and in sealing engagement with the end of the spindle.

4. The drive mechanism of claim 3 wherein a shaft is disposed within the spindle in coaxial relationship therewith and has a hub mounted thereon and where the first seal member extends radially inwardly and engages the outer periphery of the hub.

5. The drive mechanism of claim 3 further comprising an annular retainer secured to the spindle and having a radially extending portion engaging the first seal member and urging it against the end of the spindle.

6. The drive mechanism of claim 3 wherein the first seal member comprises an annular felt ring.

7. The drive mechanism of claim 6 wherein the side of the seal member which engages the end of the spindle includes a thin layer of polytetrafluororthylene on the surface thereof.

8. The drive mechanism of claim 3 wherein the drive mechanism includes means forming a flange member which extends radially outward from the spindle in parallel, spaced relationship with a face portion of the pulley and wherein the second seal means is disposed against the spindle and the flange member and in sealing engagement with the face portion of the pulley, and wherein the roller bearing is disposed between said first and second seal members.

9. The drive mechanism of claim 8 wherein the second seal member comprises an annular felt ring.

10. The drive mechanism of claim 9 wherein the portion of the second seal member which engages the face portion of the pulley includes a thin layer of polytetrafluoroethylene on the surface thereof.

11. The drive mechanism of claim 3 wherein the pulley is provided with means forming a groove adjacent the roller bearing and wherein the cup snaps into the groove to axially retain the bearing with respect to the pulley.

12. A compressor drive mechanism having an electro-magnet, a clutch plate, a rotating member intermediate the clutch plate and the electro-magnet, a stationary member radially spaced from the rotating member, a normally sealed bearing having an outer race rotatable with the rotating member and an inner race mounted on the stationary member, a hub in driven relationship to the clutch plate, a rotatable shaft disposed within said stationary member and mounting said hub for driving the compressor, and sealing means for preventing ingress of contaminants to said normally sealed bearing comprising:

a seal support and bearing retaining cup having a radially extending wall, and an axially extending wall secured to the rotating member;

a rotating seal secured to the radially extending wall of the cup and in sealing engagement with the stationary member; and, a stationary seal axially spaced from and on an opposite side of the bearing from the rotating seal and in sealing relation to the stationary member and the rotating member, whereby entry of foreign matter to the bearing between the rotating member and the stationary member is impeded.

13. The drive mechanism of claim 12 wherein the axially extending wall of the retaining cup retains the outer race of the bearing in the rotating member.

14. The drive mechanism of claim 13 wherein said rotating member is provided with means forming an annular groove member therein, and the axially extending wall of the retainer cup includes a bead formed integrally therewith which is adapted to snap into said groove.

15. The drive mechanism of claim 12 further comprising means secured to said stationary member for urging the rotating seal against said stationary member.

16. The drive mechanism of claim 12 wherein the rotating seal extends past an end of the stationary member and engages the hub in sealing relationship therewith whereby the rotating seal will also prevent ingress of contaminants between the stationary member and the hub.

17. In a clutch drive mechanism for a vehicle compressor or the like, an annular spindle, a pulley assembly having a clutch face provided thereon, a roller bearing assembly mounting the pulley on the spindle, a rotatable shaft disposed within the spindle for driving the compressor, a hub mounted on the shaft in driving relationship therewith and including a flange extending radially outward therefrom, a clutch plate carried by the flange in spaced, parallel relationship with the clutch face provided on the pulley assembly, and an electric-magnet energizable to move the clutch plate into engagement with the pulley assembly, seal means for preventing environmental contaminants from communicating with the roller bearing assembly along a path between the pulley assembly and the spindle, comprising a retainer cup secured to the pulley assembly and having an annular radial flange which extends inwardly therefrom toward the spindle and a seal member secured to said radial flange and disposed in sealing engagement with the spindle, and wherein the distal end of the spindle is provided with a seal face, and the seal member is in sealing engagement with said seal face.

18. The mechanism defined in claim 17 wherein the seal member extends inward of the seal face and terminates in sealing engagement with the hub whereby the seal means also seals the space between the spindle and the hub against entry of foreign material.

19. The mechanism defined in claim 17 further comprising means attached to the spindle for urging the seal member against the seal face.

20. The mechanism defined in claim 17 wherein the retainer cup is also a retainer for at least a portion of the roller bearing assembly in the pulley assembly.

21. The mechanism defined in claim 20 wherein the pulley assembly has an annular groove provided therein and the retainer cup includes snap ring means for engaging said groove.

22. The mechanism defined in claim 17 wherein the seal member comprises an annular felt ring.

23. The mechanism defined in claim 22 wherein the portion of the seal member which engages the spindle includes a thin layer of polytetrafluororthylene on the surface thereof.

24. The mechansim defined in claim 24 wherein the retainer cup urges the seal member against the seal face.

* * * * *